United States Patent
Yamamoto et al.

(10) Patent No.: US 6,656,560 B2
(45) Date of Patent: Dec. 2, 2003

(54) MULTI-LAYER OPTICAL RECORDING MEDIUM AND METHOD OF MANUFACTURING THE SAME

(75) Inventors: Kaoru Yamamoto, Tsurugashima (JP); Keiji Suga, Tsurugashima (JP); Noriyoshi Shida, Tsurugashima (JP); Tetsuya Iida, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/948,785

(22) Filed: Sep. 10, 2001

(65) Prior Publication Data

US 2002/0064124 A1 May 30, 2002

(30) Foreign Application Priority Data

Sep. 12, 2000 (JP) .......................................... 2000-276757

(51) Int. Cl.$^7$ ........................... B29D 17/00; B29D 11/00
(52) U.S. Cl. ................... 428/64.4; 264/1.33; 369/275.2; 425/810
(58) Field of Search ................................ 264/1.33, 106, 264/107, 1.7; 425/810; 428/64.1, 64.4, 65.2; 369/275.2

(56) References Cited

U.S. PATENT DOCUMENTS 4,644,520 A * 2/1987 Lange
4,795,511 A * 1/1989 Wouters et al.
5,972,250 A * 10/1999 Miyamoto et al.

FOREIGN PATENT DOCUMENTS

JP 10-172241 * 6/1998

* cited by examiner

*Primary Examiner*—Mathieu D. Vargot
(74) *Attorney, Agent, or Firm*—Morgan, Lewis & Bockius LLP

(57) ABSTRACT

Preformatted areas in at least the most distal recording layer from an object lens among a plurality of recording layers in an optical disc include guard areas at both ends of the respective recording layer in the tracing direction. No data is recorded on the guard areas. The guard area length GL is determined to satisfy the following formula:

$$GL \geq YL + T \times (NA/n) / [1 - (NA/n)^2]^{1/2}$$

where YL is a maximum allowable value of position deviation between the preformatted areas in the most distal recording layer and in another recording layer in the tracing direction; NA is the numerical aperture of the object lens; T is a distance between the most distal and the another recording layer; and "n" is an refraction index of a medium between the most distal and the another recording layers.

6 Claims, 13 Drawing Sheets

MULTI-LAYER OPTICAL RECORDING MEDIUM AND METHOD OF MANUFACTURING THE SAME

BACKGROUND OF THE INVENTION

1. Field of the Invention

The present invention relates to a multi-layer optical recording medium having a plurality of recording layers, and more particularly to a multi-layer optical recording medium having data recording regions divided by preformatted regions and a method of manufacturing the recording medium.

2. Description of the Related Art

A multi-layer optical disc is recently known as a large capacity recording medium that has an increased recording capacity per one side of the optical disc. Such multi-layer optical disc has a structure in which a plurality of recording layers are stacked at relatively small gaps. Another type of conventional multi-layer optical disc is a rewritable multi-layer optical disc employing a recording material or medium such as a phase change medium.

For simplicity of description, the following description deals with a two-layer DVD (Digital Versatile Disc) having two recording layers in which each layer contains the phase change medium. More particularly, the two-layer DVD has a structure in which phase-change recording films are formed on both layers, that is, an upper layer (or first recording layer) which is proximate to an object lens of an optical pickup and a lower layer (or second recording layer). A laser beam is focused on one of the recording layers and a signal is recorded on or reproduced from the recording layer when information is recorded on or reproduced from the two-layer disc.

It should be assumed now that the laser beam is focused on the second recording layer (hereinafter, simply referred to as "second layer") of the above described two-layer DVD or the like upon recording or reproduction. In this case, the laser beam is transmitted through the first recording layer (hereinafter, simply referred to as "first layer") and is radiated on the second layer to record and/or reproduce a data signal. Such recording and/or reproduction (hereinafter, simply referred to as "recording/reproduction") is influenced by the first layer if an amount of light reflected from the first layer and received by a light receiving unit varies and/or if an amount of light transmitted to the second layer through the first layer varies. An adverse effect caused by the variations in the amount of reflected light from the first layer can be reduced by modifying a structure of a light detecting system or other element(s). The variations in the amount of transmitted light through the first layer, however, remain in the form of variations in intensity of the recording light during the recording operation, and in the form of variations in level of a reproduced signal during the reproducing operation. These adverse effects are sometimes not negligible.

When a phase change medium such as germanium antimony tellurium (GeSbTe) is used for the recording layer, optical transmittance of a crystal portion of the medium differs from that of an amorphous portion; the former is lower than the latter. Almost 100% of the areas of the phase change medium which have no data recorded thereon are crystal portions, while crystal portions and amorphous portions exist in the recorded areas in a mixed manner. Further, the transmittance for the beam is an average value of the transmittance of the crystal portion and that of the amorphous portion although the beam is not focused on the recorded area of the first layer and the recorded signal is not reproduced therefrom. As a result, upon reproduction of the second layer, the amount of received light (i.e., the RF signal level during the reproducing operation) differs according to whether the beam passes through the recorded area or the non-recorded area of the first layer.

If the ratio of the crystal area to the amorphous area is constant in the region of the first layer through which the beam passes, the transmittance of the beam does not change so that the amount of received light (i.e., RF signal level) does not change.

A general rewritable multi-layer optical disc, however, is provided with a preformatted area in which no data signal is recorded. Referring to FIGS. 1 and 2 of the accompanying drawings, a DVD-RAM (Random Access Memory) will be taken as an example. The disc 3 has recording areas divided by preformatted areas 5 in a tracing direction (i.e., circumferential or tangential direction of the disc) and a plurality of data areas 6 are concentrically formed. A sector 7 is defined by a preformatted area 5 and an adjacent data area 6.

FIG. 2 illustrates an enlarged view of the preformatted area and the neighboring areas (portion "A" in FIG. 1) together with transmittance of these areas. Information data such as an addresses is recorded in the form of embossed pits 8 within the preformatted area 5. The data area 6 includes lands (L) and grooves (G), and recorded marks 9 are formed on data recorded portions.

As illustrated in FIG. 2, the average transmittance $T_D$ of the data area 6 is greater than the transmittance $T_P$ of the preformatted area 5. Thus, the transmittance changes in the preformatted area 5 of the first layer and the recording beam intensity or reproduced signal intensity changes when the recording operation or reproducing operation is performed for the second layer. In order to avoid the adverse effect from occurring in the multi-layer optical recording medium having the preformatted areas during information recording and/or reproduction, the positions of the preformatted areas in the first layer should be aligned with those of the preformatted areas in the second layer as shown in FIG. 3. No adverse influence occurs during the recording and/or reproduction operations if the preformatted areas of the second layer always lie below the preformatted areas of the first layer that would reduce the amount of transmitted light. It is, however, practically difficult to align the positions of the preformatted areas with each other in a manufacturing process.

There is therefore a demand for a method of manufacturing an optical disc having the preformatted areas of the first layer aligned with those of the second layer, or an optical disc that has minimized location deviations of the preformatted areas between the first and second layers. It is also necessary that the adverse effects in recording/reproduction operations such as an S/N ratio (signal to noise ratio) deterioration and reproduced RF signal variations resulting from the above described transmittance variations are prevented even if the preformatted areas of the manufactured disc are not aligned with each other between the recording layers.

OBJECT AND SUMMARY OF THE INVENTION

The present invention aims to solve the above described problems, and one of the objects of the present invention is to provide a manufacturing method of an optical disc that can reduce position deviation or alignment of the preformatted areas between the recording layers.

Another object of the present invention is to provide a high-performance rewritable multi-layer optical recording medium that ensures stable recording and reproduction even if the positions of the preformatted areas are not aligned with each other.

According to one aspect of the present invention, there is provided a rewritable multi-layer optical recording medium having a plurality of recording layers, wherein data recording areas are divided by preformatted areas in a tracing direction in each of the plurality of recording layers, wherein the preformatted areas in at least a most distal recording layer among the plurality of recording layers from an object lens adapted to collect a radiated light beam include guard areas located at both ends of the respective preformatted areas in the tracing direction and having no data recorded thereon, and wherein the length of the guard area GL satisfies;

$$GL \geq YL + T \times (NA/n)/[1-(NA/n)^2]^{1/2}$$

where,

YL: a maximum allowable value of position deviation between the preformatted areas in the most distal recording layer and in another recording layer in the tracing direction NA: the numerical aperture of the object lens T: a distance between the most distal recording layer and the another recording layer n: an refraction index of a medium between the most distal recording layer and the another recording layer.

According to another aspect of the present invention, there is provided a method of manufacturing a rewritable and rotatable multi-layer optical recording medium having a plurality of recording layers, wherein data recording areas are divided by preformatted areas in each of the plurality of recording layers in a tracing direction, which comprises the steps of:

A) forming a projection of a circular shape on a first substrate such that the projection is substantially coaxial to a rotation center of the first substrate, the first substrate having at least one recording layer;

B) forming a recess in a second substrate such that the recess is substantially coaxial to a rotation center of the second substrate and adapted to engage with the projection, the second substrate having at least one recording layer; and C) engaging the projection and the recess with each other to attach the first and second substrates to each other.

DETAILED DESCRIPTION OF THE PREFERRED EMBODIMENT

Figure 1:
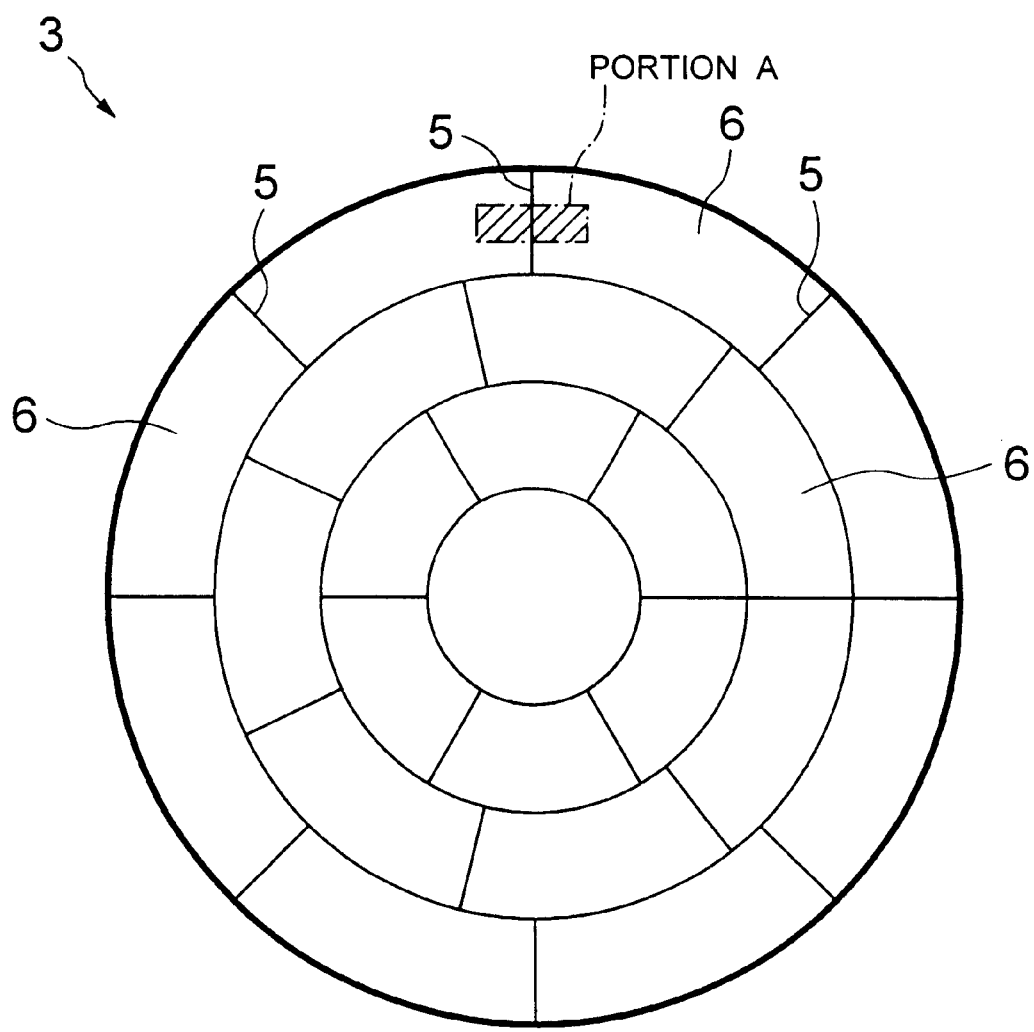
FIG. 1 schematically illustrates a view of a structure of an optical disc including preformatted areas, data areas and sectors.
Figure 2:
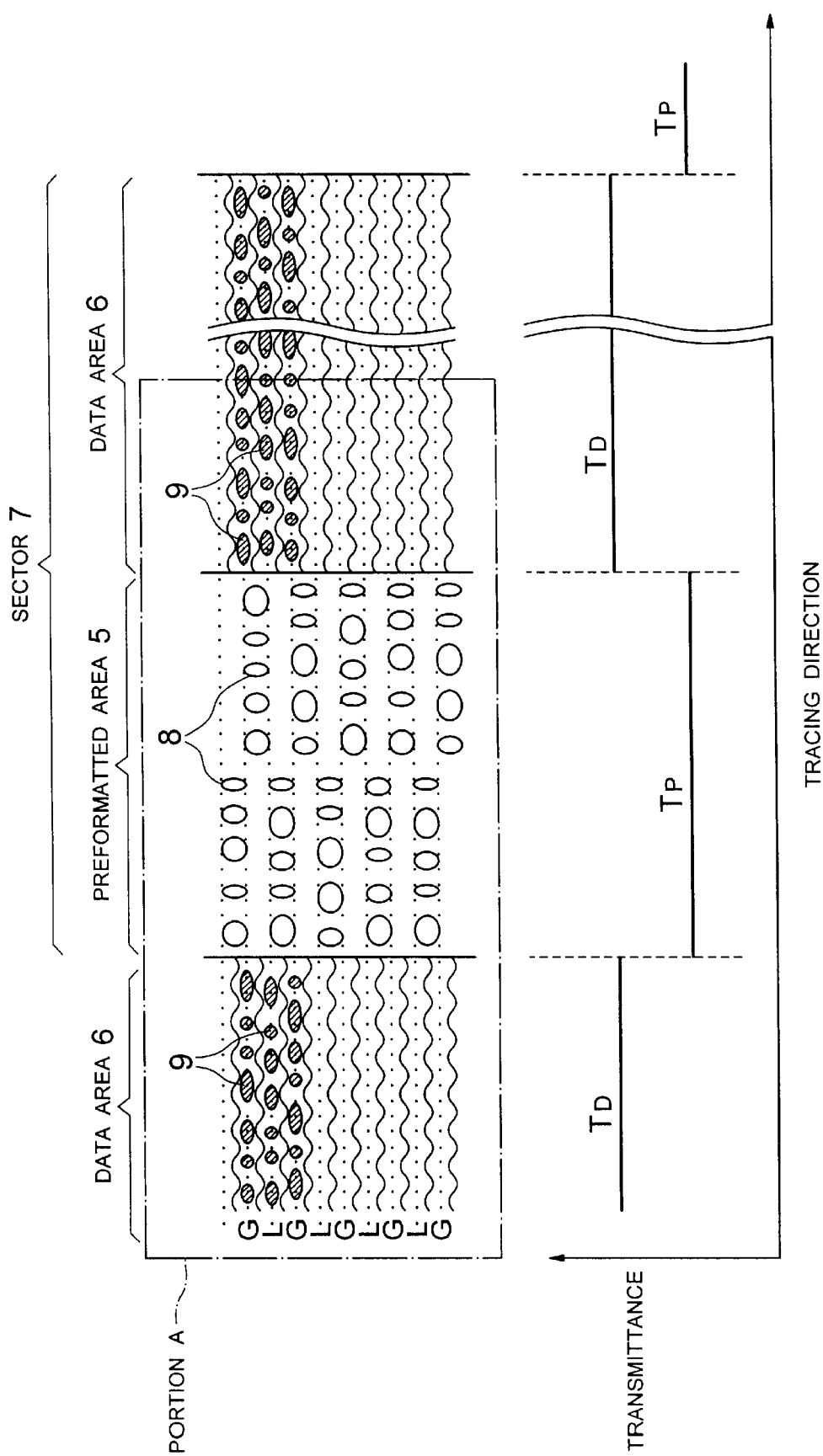
FIG. 2 schematically illustrates an enlarged view of the preformatted area and the data areas together with transmittance of these areas.
Figure 3:
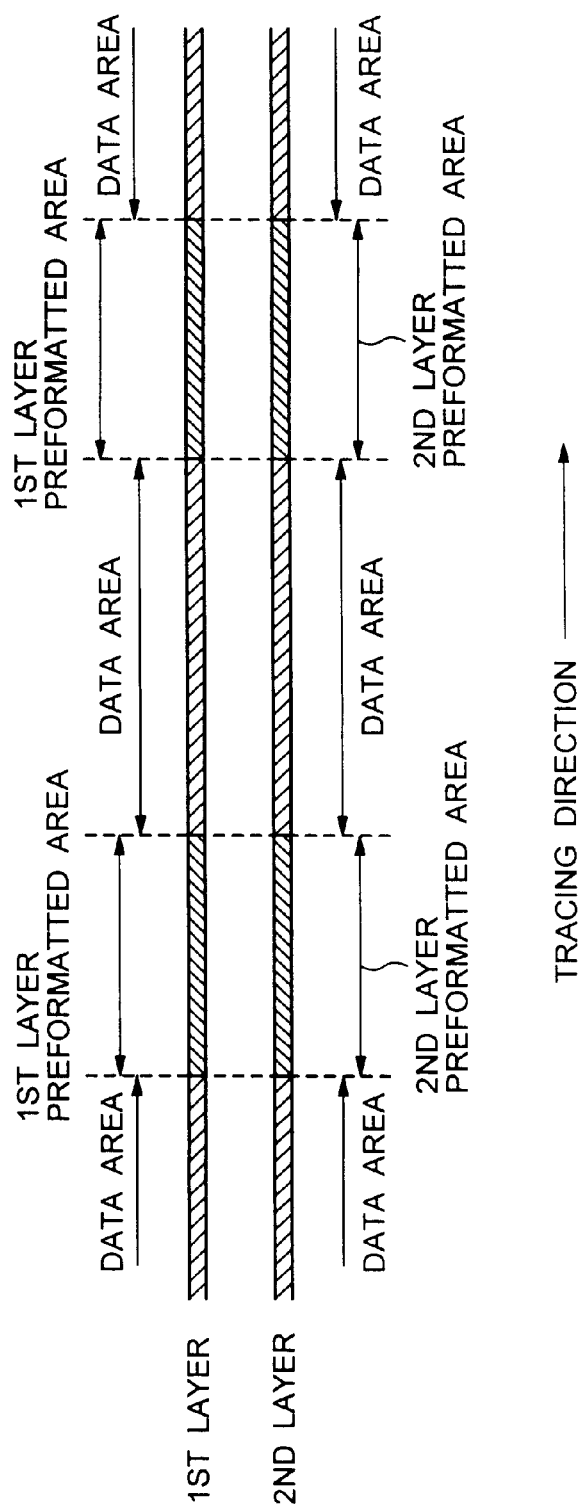
FIG. 3 illustrates a cross sectional view of first and second layers of an optical disc when positions of preformatted areas in the first and second layers are aligned with each other.

Embodiments of the present invention will now be described in detail in reference to the accompanying drawings. It should be noted that similar reference numerals are assigned to similar elements in different drawings.

First Embodiment

Figure 4:
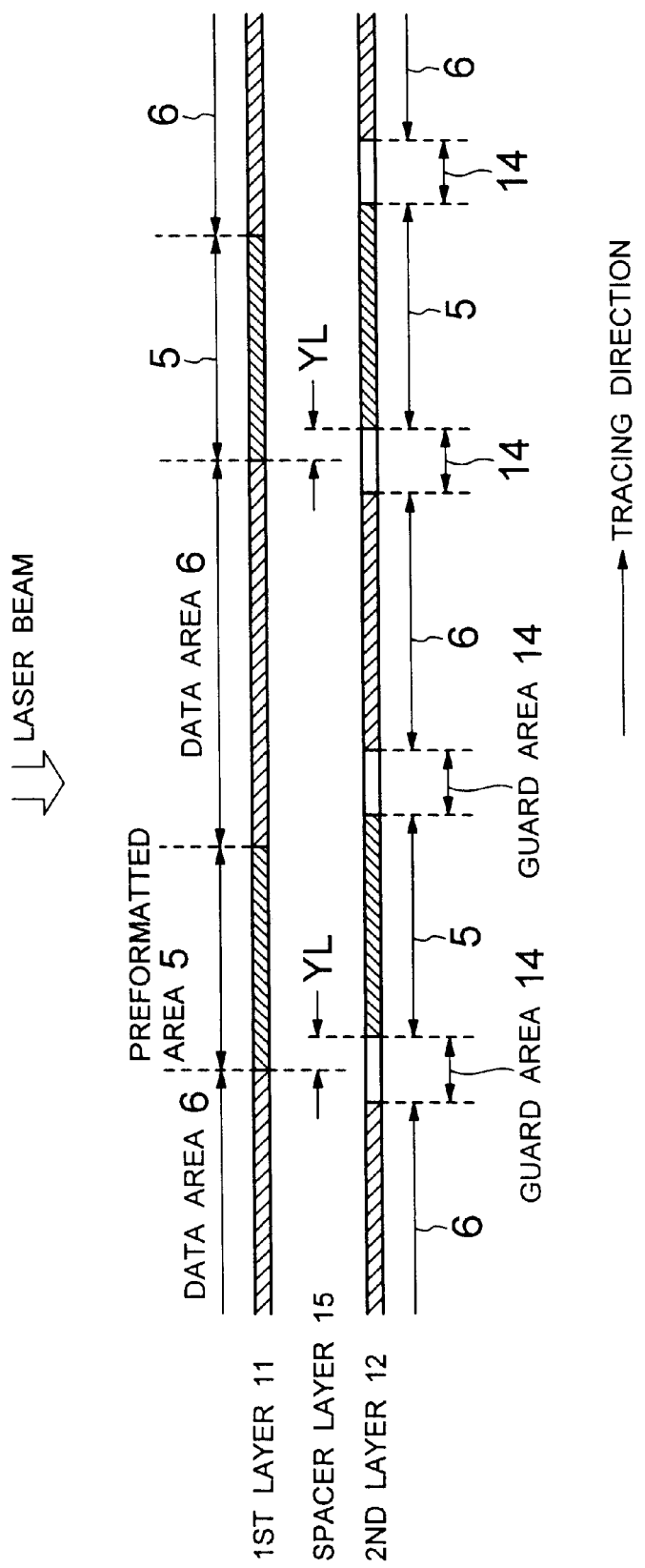
FIG. 4 illustrates a cross sectional view of a structure of a two-layer optical disc according to the present invention, taken in a tracing direction of the optical disc.

Referring to FIG. 4, schematically illustrated is a cross sectional view of a structure of a two-layer optical disc according to the present invention, taken along a tracing direction. The two-layer optical disc 3 includes a first recording layer (upper layer) 11 and a second recording layer (lower layer) 12 when viewed in a direction of a laser beam radiated to record or reproduce an information data signal. The second layer is therefore a layer distal from an object lens adapted to collect the laser beam.

The first recording layer (first layer) 11 includes preformatted areas 5 and data areas 6. The second recording layer (second layer) 12, on the other hand, includes preformatted areas 5, data areas 6 and guard areas 14. The guard areas are formed at both ends of each preformatted area 5 in the tracing direction, and no data is recorded on the guard areas.

As illustrated in FIG. 4, the positions of the preformatted areas 5 in the first layer 11 are offset from those of the preformatted areas 5 in the second layer 12 in the tracing direction. This offset or position deviation (YL) is produced when the optical disc 3 is fabricated.

Each of the first and second layers 11 and 12 also includes a phase-change recording medium or material such as germanium antimony tellurium (GeSbTe). The phase-change recording medium is in an amorphous state when it is formed and has low reflectance (i.e., high transmittance). If a laser beam is radiated to a certain area prior to recording during an initializing process, the temperature of the radiated area is raised. The radiated area becomes crystallized and has low transmittance when the area is cooled after its temperature exceeds a crystallization temperature. In order to perform the data recording, the laser beam is radiated to a particular area from an optical pickup to raise the temperature of the area. After its temperature exceeds a melting point, the area is quickly cooled to create an amorphous mark of low reflectance and high transmittance.

There is provided a spacer layer 15 between the first and second layers 11 and 12 as an interlayer medium. The spacer layer 15 is made from a material, such as an ultraviolet curing resin, having high transmittance in a wavelength range of the laser beam, since the spacer layer 15 serves as a light path for the laser beam.

Figure 5:
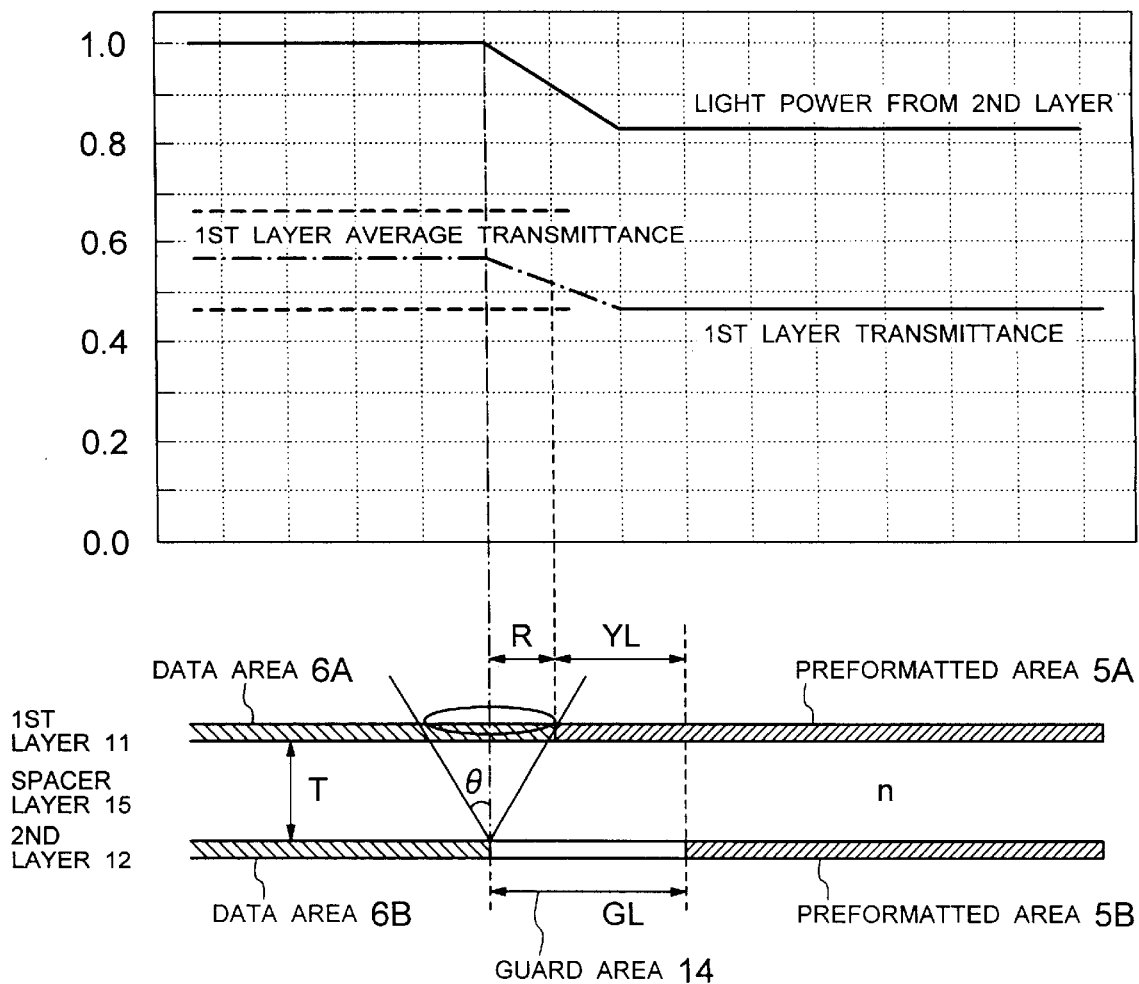
FIG. 5 schematically illustrates an enlarged view of the preformatted areas and the data areas in the first and second layers in the vicinity of a boundary between the preformatted and data areas, taken along the tracing direction, according to a first embodiment of the present invention, together with the average transmittance of the first layer and power variations of a reflected light beam from the second layer.

Referring to FIG. 5, schematically illustrated is an enlarged view of a boundary region between a preformatted area 5A and a data area 6A in the first layer 11 and a boundary region between a preformatted area 5B and a data area 6B in the second layer 11. FIG. 5 also shows a graph of the average transmittance of the first layer 11 and the power variation of a reflected laser beam from the second layer 12 in the tracing direction when the laser beam is focused on the second layer 12. The power variation is normalized using the light power radiated on the data area 6B for data reproduction.

When the laser beam is focused on the second layer 12 to reproduce data from the second layer 12, the average transmittance of the first layer 11 is higher in the data area 6A and the transmittance of the first layer 11 is lower in the preformatted area 5A. In addition, the average transmittance gradually changes (i.e., decreases) as the laser beam moves from the data area 6A to the preformatted area 5A of the first layer 11 because the laser beam has a certain span or diameter in the first layer 11. It should be noted that the shape of the laser beam and the light intensity distribution in the laser beam transmitting the first layer 11 are not considered for simplicity of calculation, and the variation of the average transmittance is approximated by the linear line. The light power from the second layer 12 changes in accordance with the average transmittance variation of the first layer 11.

When the laser beam is focused on the second layer 12 to reproduce the data from the second layer 12, an area which is subject to the influence of the transmittance variation of the first layer 11 is expanded to an extent determined by the radius R of the laser beam in the first layer 11 as shown in the lower illustration of FIG. 5. The length GL of the guard area 14 in the tracing direction is therefore required to be extended by the laser beam radius R from the position offset YL between the preformatted areas 5A and 5B. In other words, the length of the guard area 14 should satisfy the following equation:

$$GL \geq YL + R \quad (1)$$

Figure 6:
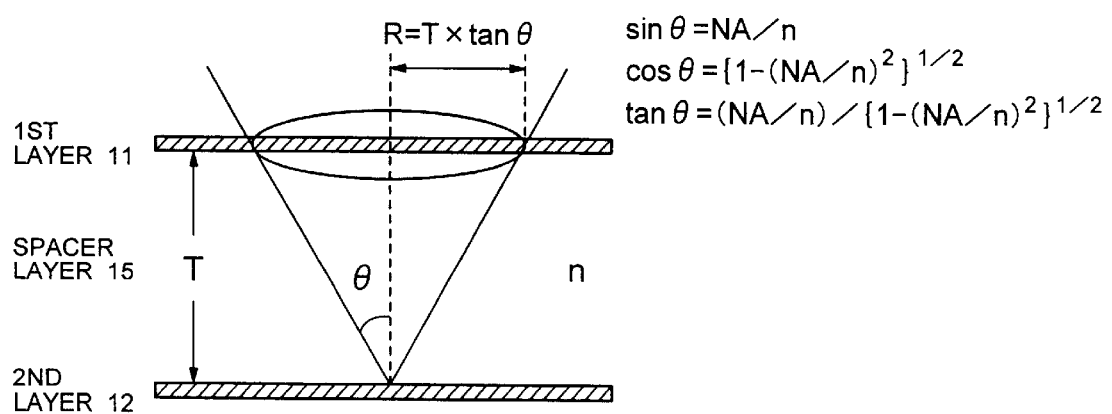
FIG. 6 illustrates a radius R of a light beam in the first layer when the light beam is focused on the second layer.

When the laser beam is focused on the second layer 12, the laser beam radius R at the first layer 11 changes with the numerical apertures (NA) of the object lens of the optical pickup system, a refractive index (n) of the spacer layer 15 through which the laser beam passes, and an interval (T) between the recording layers as illustrated in FIG. 6. If the angle of expansion of the laser beam is given by θ, the laser beam radius R can be expressed by the following formula:

$$R = T \times \tan\theta \quad (2)$$

where $$\sin\theta = NA/n \quad (3)$$

$$\cos\theta = [1-(NA/n)^2]^{1/2} \quad (4)$$

$$\tan\theta = (NA/n)/[1-(NA/n)^2]^{1/2} \quad (5)$$

Consequently, the length of the guard area 14 (GL) should be determined to satisfy the following equation:

$$GL \geq YL + T \times (NA/n)/[1-(NA/n)^2]^{1/2} \quad (6)$$

As long as this condition is satisfied, the data recording and reproduction can be conducted for the data areas 6B of the second layer 12 without being affected by the preformatted areas 5A of the first layer 11. The position deviation or offset YL in the above equations may be set, for example, to a maximum tolerance limit of the manufacturing process.

Second Embodiment

A second embodiment of the present invention will now be described in reference to the accompanying drawings.

Figure 7:
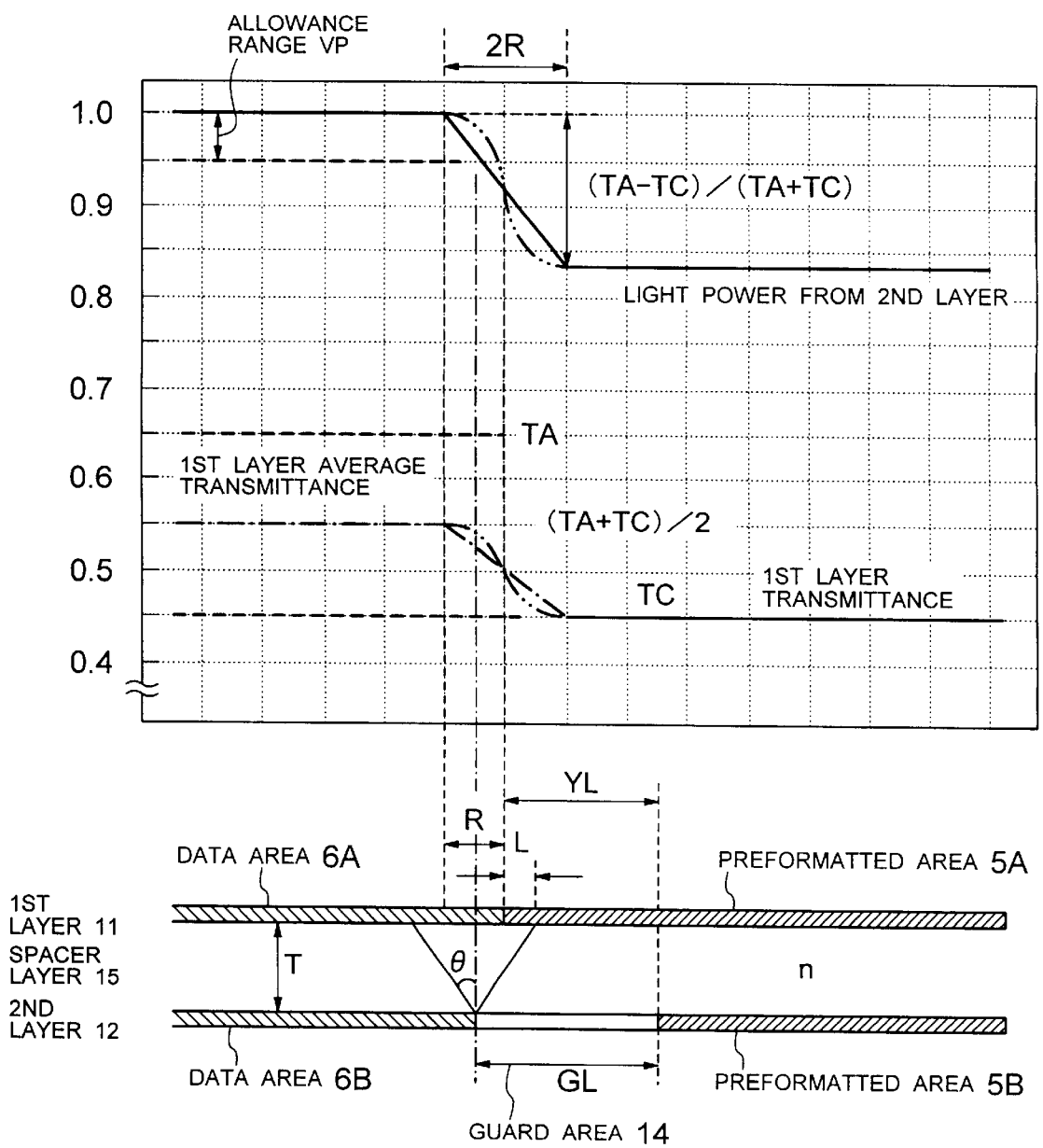
FIG. 7 schematically illustrates an enlarged view of the preformatted and the data areas in the first and second layers in the vicinity of a boundary between the preformatted and data areas, taken along the tracing direction, according to a second embodiment of the present invention, together with the average transmittance of the first layer and power variations of a reflected light beam from the second layer.

Referring to FIG. 7, schematically illustrated is an enlarged view of a boundary area between the preformatted area 5A in the first layer 11 and the preformatted area 5B in the second layer 12. This drawing also shows in its upper region a graph of the average transmittance of the first layer 11 and power variations of the reflected laser beam from the second layer 12 in the tracing direction when the laser beam is focused on the second layer 12. The power variations of the reflected laser beam is normalized using the light power radiated onto the data area 6B for data reproduction. It should be noted that the solid line and single-dot chain line are drawn on the assumption that the shape of the laser beam is square in the first layer 11 and the light intensity distribution of the laser beam is constant through the first layer 11 for simplification the calculation. The two-dot chain line and three-dot chain line indicate the average transmittance and the power variations of the reflected laser beam from the second layer 12 where the laser beam is assumed to have a circular shape and the light intensity distribution of the laser beam is taken into account. The power variations in the graph is also normalized using the light power radiated on the data area 6B for data reproduction.

In the first embodiment, the length of the guard area 14 is determined such that the laser beam power from the second layer 12 does not change until the laser beam reaches the guard area 14 of the second layer 12. In an actual system design, however, the length of the guard area 14 can be reduced from the value indicated in the first embodiment if the power change is admitted to a certain extent.

As illustrated in the graph of FIG. 7, when the laser beam moves from the data area 6A of the first layer 11 to the preformatted area 5A and part of the laser beam reaches the preformatted area 5A, the laser beam power starts decreasing. If the decrease tolerance limit of the laser beam power is given by VP (e.g., VP=0.05 when the decrease tolerance limit is 5%), the transmittance of the crystal portion of the phase-change medium is TC and the transmittance of the amorphous portion is TA, then part of the laser beam can enter the preformatted area 5A by the length L, which is expressed by the following equation:

$$L = 2 \times R \times VP \times (TA+TC)/|TA-TC| \quad (7)$$

To derive the above equation, the laser beam configuration in the first layer 11 is assumed to be square and the beam intensity distribution is constant in the first layer to simplify the calculation.

The length GL of the guard area 14 in the tracing direction is therefore determined to satisfy the following formula:

$$GL \geq YL + R - L \qquad (8)$$
$$= YL + R \times [1 - 2 \times VP \times (TA + TC)/|TA - TC|]$$

$$R = T \times (NA/n)/[1 - (NA/n)^2]^{1/2} \qquad (9)$$

When the length GL of the guard area 14 is determined to satisfy the above condition, it is possible to confine the laser beam power variations within a predetermined allowance range and perform stable (reliable) recording and reproduction operations even if there is influence of the preformatted areas 5A of the first layer 11. Further, it is feasible to elongate the length L in the equation (7) to a certain extent, depending upon the allowable power variation, because the average transmittance varies as indicated by the two-dot chain line in FIG. 7 when the laser beam shape and the intensity distribution of the laser beam are taken into consideration. This further reduces the length required to the guard area.

The above described embodiments deal with the two-layer optical disc, but the present invention is applicable to an optical disc having a plurality of phase-change recording layers. In such instance, the guard areas are provided for the preformatted areas in the recording layer which is most distal, among a plurality of recording layers, from the object lens adapted to collect the laser beam.

Third Embodiment

Figure 8:
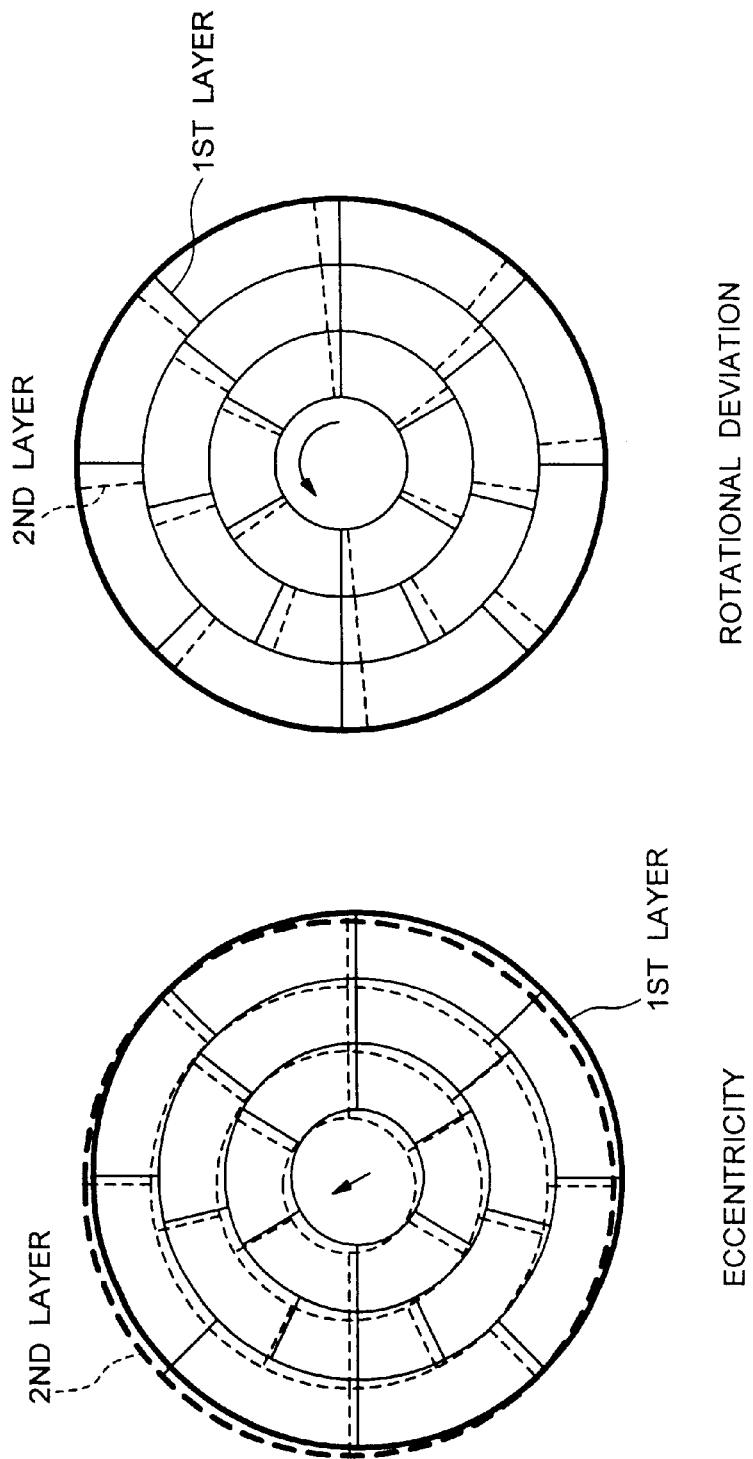
FIG. 8 illustrates an eccentricity and a radial position deviation between the first and second recording layers, which cause position deviation of the preformatted areas.

Before describing a third embodiment of the present invention, the offset (position deviation) of the preformatted areas will be described. As depicted in FIG. 8, the preformatted area position deviations are caused from a discrepancy in the center position (i.e., eccentricity) and a discrepancy in the disc rotational direction between the first recording layer and the second recording layer.

Figure 9:
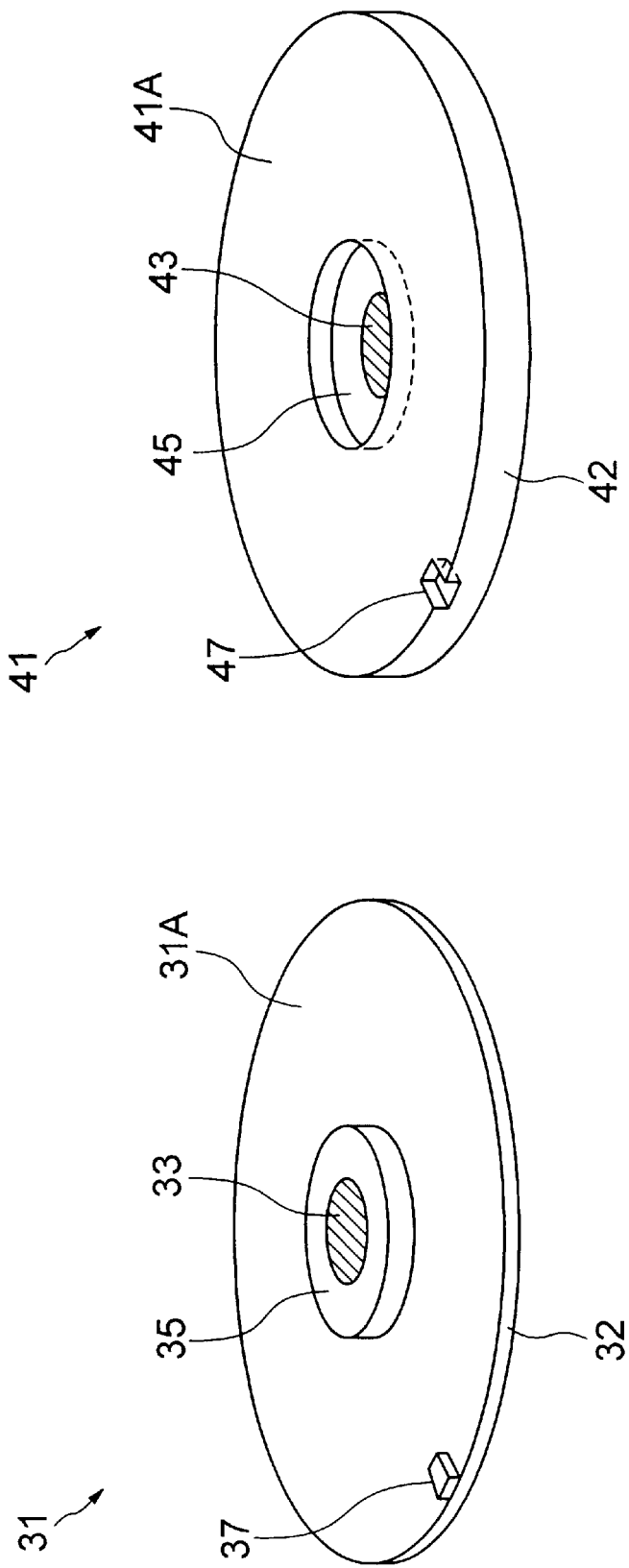
FIG. 9 illustrates a perspective view of a first substrate having a first recording layer and a second substrate having a second recording layer according to a third embodiment of the present invention.

FIG. 9 is a perspective view of the third embodiment of the present invention and illustrates a structure of a first substrate 31 having the first recording layer and a second substrate 41 having the second recording layer. The first substrate 31 has a circular (or an annular) projection 35 that is substantially coaxial to the rotation center of the first substrate 31.

The second substrate 41 has a circular recess 45 that is substantially coaxial to the rotation center of the second substrate 41 and is adapted to receive the projection 35 of the first substrate 31. The second substrate 41 also has a recess 47 near its periphery that engages with a projection 37 formed on the first substrate 31. The recess 47 is formed at a position corresponding to the position of the projection 37. In other words, the recess 47 is formed at the position that fits over the projection 37 when the first and second substrates 31 and 47 are engaged to each other, and the position of the recess 47 substantially alignes the preformatted areas of the first substrate 31 with the preformatted areas of the second substrate 41.

Figure 10:
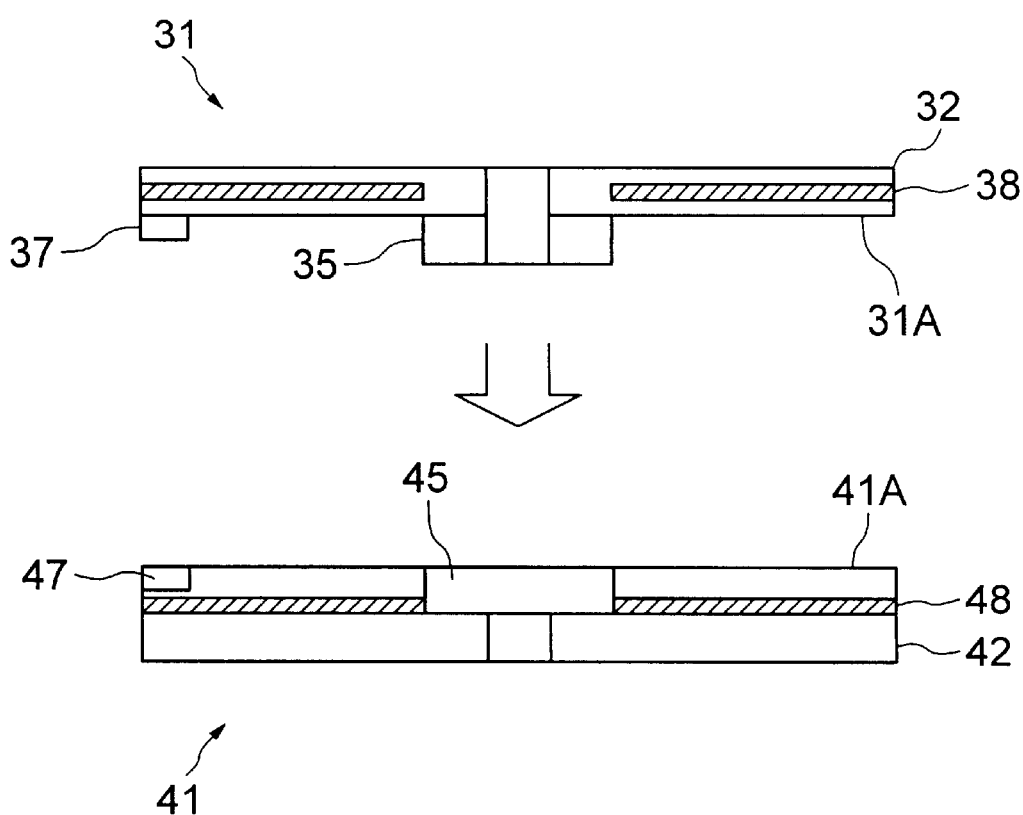
FIG. 10 illustrates a cross sectional view of the first and second substrates showing a manner of attaching the first substrate to the second substrate shown in FIG. 9.

Referring to FIG. 10, schematically illustrated is a cross sectional view to describe the manner of attaching the first substrate 31 to the second substrate 41 shown in FIG. 9. As mentioned above, the first substrate 31 includes the recording layer (i.e., first layer 38) and the second substrate 41 includes the recording layer (i.e., second layer 48). The mating face 31A of the first substrate 31 is directed to the mating face 41A of the second substrate 41 when these two substrates are united. When attaching the first substrate 31 to the second substrate 41, the circular projection 35 of the first substrate 31 fits in the recess 45 of the second substrate 41, as described earlier, so that an amount of eccentricity is reduced or minimized.

The projecting portion 37 formed near the periphery of the first substrate 31 fits in the recess portion 47 formed in the second substrate 41. As described above, when the projection 37 and the recess 47 are engaged with each other, the preformatted areas of the first substrate 31 are substantially aligned with those of the second substrate 41 so that the deviation in the rotation direction is also reduced or minimized.

Accordingly, the optical disc having the reduced eccentricity and rotational deviation (i.e., reduced preformatted area position deviation) is obtained.

Although the above described embodiment deals with a configuration in which the first substrate 31 has the projections 35 and 37 and the second substrate 41 has the mating recesses 45 and 47, the positions of the projections and recesses are interchangeable. For example, the first substrate 31 may have the circular projection and peripheral recess and the second substrate 41 may have the mating recess and projection. The positions of the projections and recesses are arbitrary as long as the projections and recesses do not obstacle the recording layers.

Fourth Embodiment

Figure 11:
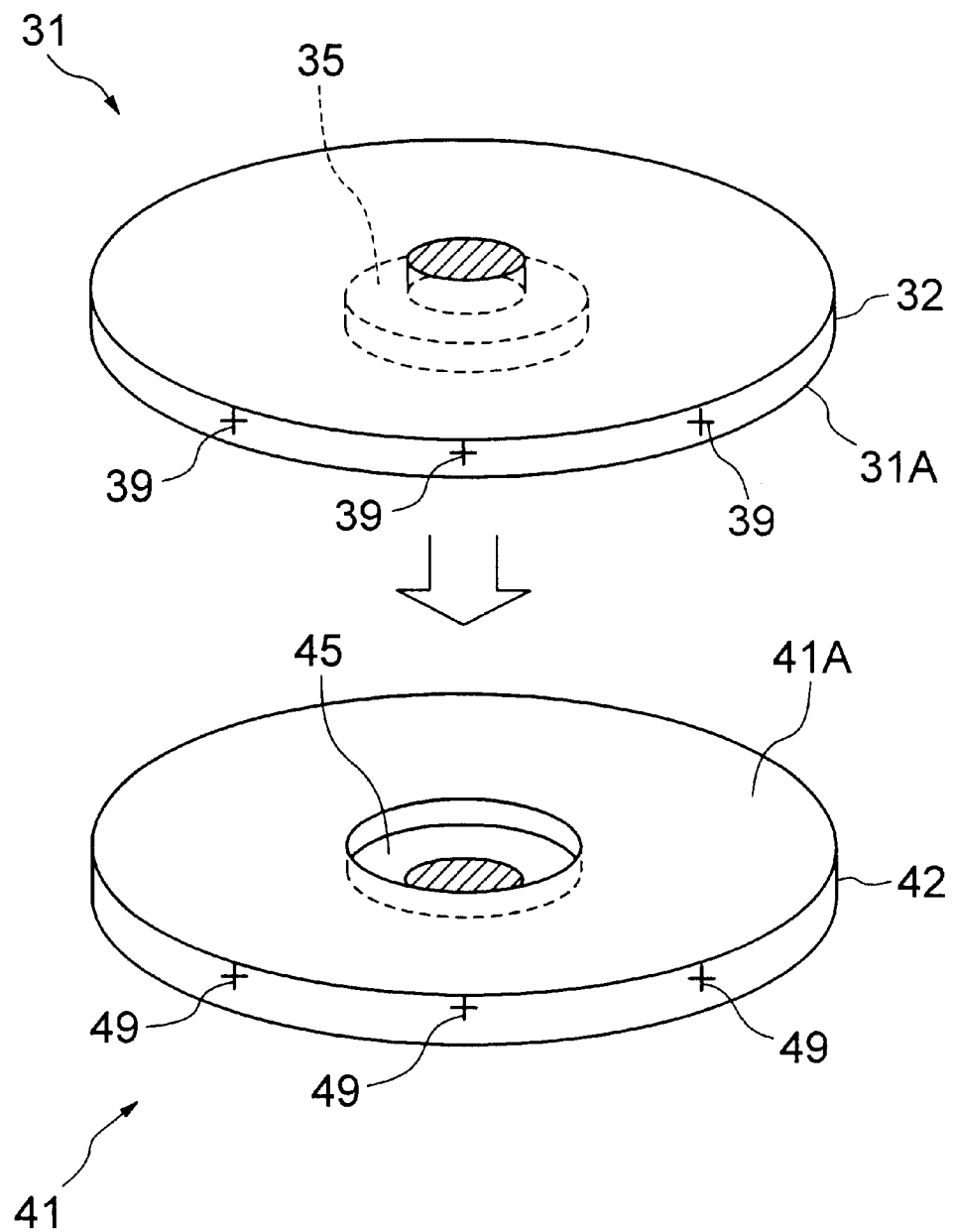
FIG. 11 illustrates a perspective view of a structure of an optical disc according to a fourth embodiment of the present invention, and is useful to describe a manner of attaching two substrates to each other.

Referring to FIG. 11, schematically illustrated is a view to describe a method of manufacturing the optical disc 3 according to a fourth embodiment of the present invention. This embodiment is the same as the third embodiment in that the first substrate 31 has the circular projection 35 and the second substrate 41 has the recess 45 that engages with the projection 35. Engagement between the projection 35 and the recess 45 therefore also reduces the eccentricity in this embodiment.

In the fourth embodiment, the first substrate 31 has marks 39 ("+" marks in the drawing) formed in the center area, peripheral area or peripheral side portion of the first substrate 31 to indicate positions of the preformatted areas in the recording layer of the first layer 31. Likewise, the second substrate 41 has marks 49 ("+" marks in the drawing) formed at the peripheral side portion of the second substrate 41 to indicate positions of the preformatted areas in the recording layer of the second layer 41.

Affixing of the first substrate 34 onto the second substrate 41 is conducted such that the marks 39 and 49 are aligned with each other. This reduces the deviation in the rotational direction of the optical disc.

It should be noted that the locations of the marks 39 and 49 unnecessarily indicate the exact locations of the preformatted areas. In other words, it is satisfactory as long as the relative relationship between the marks 39 and the preformatted areas in the first substrate is the same as that between the marks 49 and the preformatted areas in the second substrate. That is, it is satisfactory as long as the positions of the preformatted areas in the first substrate are substantially aligned with those in the second substrate as a result of matching the marks of the first substrate to those of the second substrate and uniting the first substrate to the second substrate. It should also be noted that any mark may be employed for this purpose, such as those written during the signal recording and those created during a process of fabricating the substrates (e.g., concave and/or convex portions formed on the substrates).

Fifth Embodiment

Figure 12:
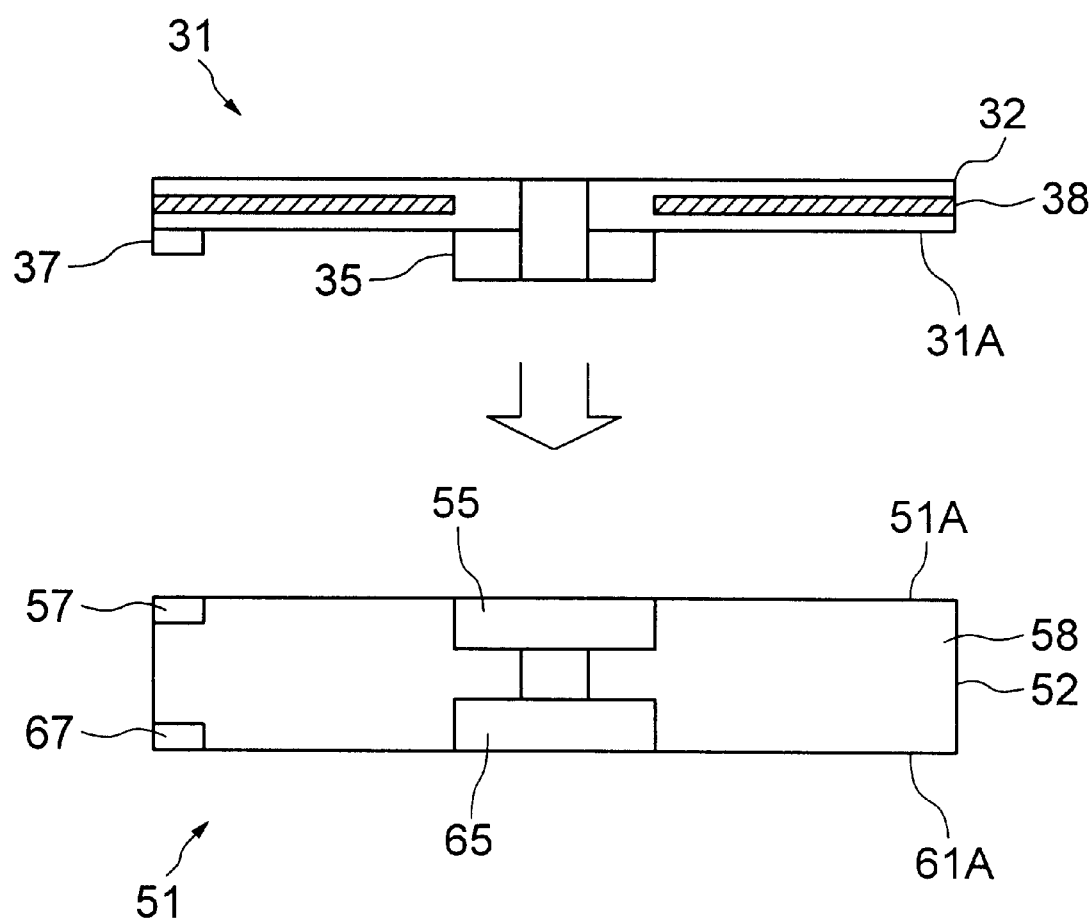
FIG. 12 illustrates a cross sectional view of a structure of a dual-sided optical disc according to a fifth embodiment of the present invention, and is useful to describe a manner of attaching substrates to each other.
Figure 13:
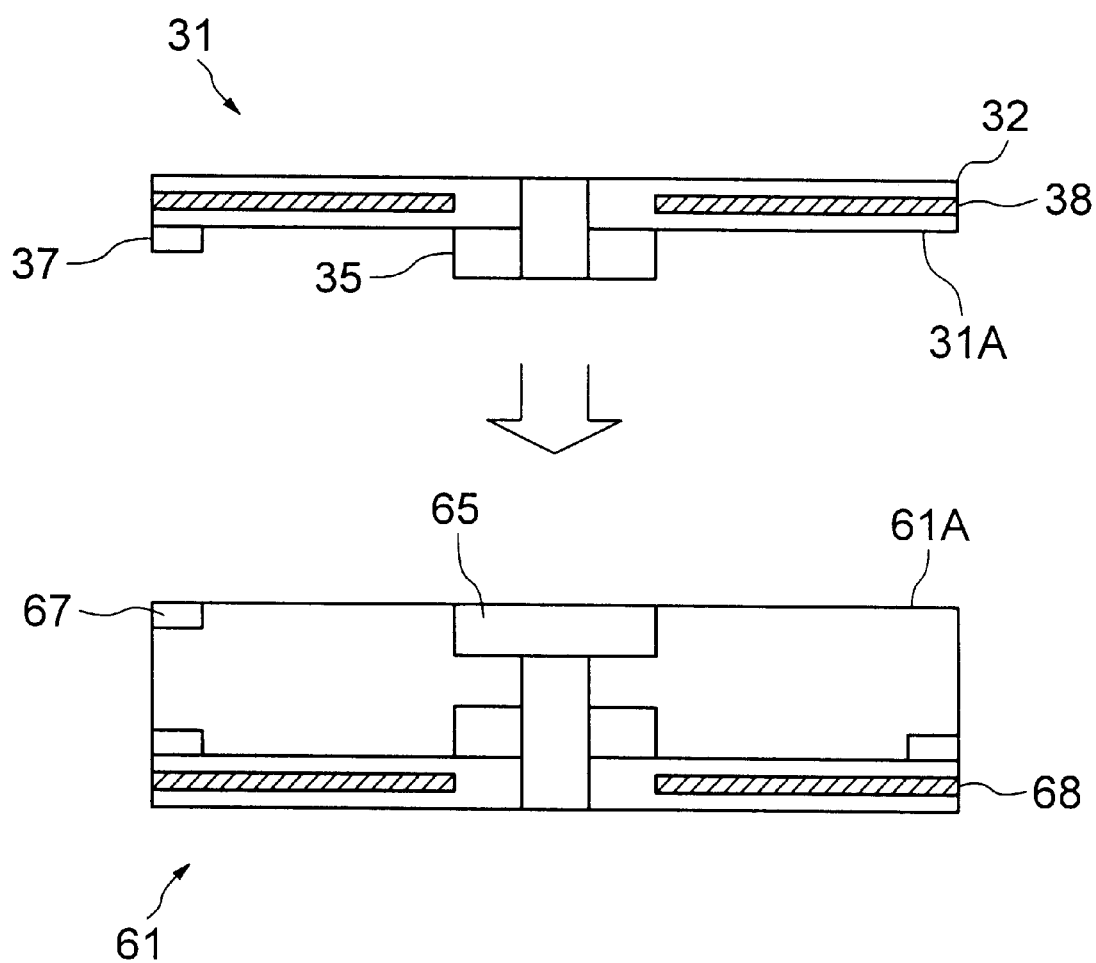
FIG. 13 also illustrates a cross sectional view of the structure of the dual-sided optical disc according to the fifth embodiment of the present invention, and is useful to describe the manner of attaching the substrates to each other

The above described embodiments are concerned with a single-sided disc, but the present invention can be applied to a dual-sided (double-sided) disc in a similar manner. Referring to FIGS. 12 and 13, schematically illustrated is a cross sectional view to describe a method of manufacturing the optical disc 3 according to a fifth embodiment of the present invention.

The first substrate 31 having a recording layer (second layer) 38 is prepared as illustrated in FIG. 12, like the third embodiment. The first substrate 31 therefore possesses the circular projection 35 at its center and the projection 37 near its edge.

Another substrate 51 that does not possess a recording layer and is designed to be attached to the first substrate is then prepared. Like the second substrate 41 in the third embodiment, the substrate 51 includes recesses 55 and 57, which engage with the projections 35 and 37 on the first substrate 31, on its face 51A that adheres to the first substrate 31. The other adhesion face 61A of the substrate 51 opposite the face 51A also has an circular recess 65 at its center and a recess 67 near its edge.

As in the third embodiment, the faces 31A and 51A are attached to each other. As illustrated in FIG. 13, the resulting substrate 61 is now utilized as the second substrate having the recording layer 38 as in the third embodiment. The substrate 61 has an circular recess 65 at its center and a recess 67 near its edge on the face 61A, which recesses are to be engaged with the center projection 35 and peripheral projection 37 on another first substrate 31 respectively. By attaching the first substrate 31 onto the second substrate 61 having the recording layer 68, it is possible to obtain a dual-sided optical disc that has the reduced eccentricity and deviation in the rotational direction, i.e., the reduced preformatted area position deviation.

As described in the foregoing, the present invention can provide an optical disc that has smaller position deviation between preformatted areas in one recording layer and those in an adjacent recording layer. In addition, even if there is slight position deviation between the preformatted areas of the adjacent recording layers, the optical disc of the present invention can realize stable data recording and reproduction.

It should be noted that the illustrated and described embodiments are examples of the present invention, and therefore suitable changes and modifications can be made to the embodiments, and/or the embodiments can be combined with each other without departing from the scope and spirit of the present invention.

As understood from the above description, the present invention provides a multi-layer optical recording medium with which stable data recording and reproduction can be assured. The present invention also provides an optical disc with reduced position deviation between preformatted areas of adjacent recording layers.

The invention has been described with reference to the preferred embodiments thereof. It should be understood by those skilled in the art that a variety of alterations and modifications may be made from the embodiments described above. It is therefore contemplated that the appended claims encompass all such alterations and modifications.

This application is based on Japanese Patent Application No. 2000-276757 which is hereby incorporated by reference.

What is claimed is:

1. A method of manufacturing a rewritable and rotatable multi-layer optical recording medium having a plurality of recording layers, wherein data recording areas are divided by preformatted areas in each of the plurality of recording layers in a tracing direction, comprising the steps of:
   A) forming a first projection of a circular shape on a first substrate such that said first projection is substantially coaxial to a rotation center of said first substrate, said first substrate having at least one recording layer;
   B) forming a first recess in a second substrate such that said first recess is substantially coaxial to a rotation center of said second substrate and adapted to engage with said first projection, said second substrate having at least one recording layer;
   C) forming a second projection on said first substrate in one of a center portion and a peripheral portion of said first substrate; and
   D) forming a second recess in said second substrate such that said second recess has a shape for engaging with said second projection; and
   E) attaching said first and second substrates to each other so as to engage said first projection and said second projection with said first recess and said second recess, respectively,
      wherein said second projection and said second recess are formed at positions so as to substantially align the preformatted areas of said first substrate with the preformatted areas of said second substrate when attaching said first and second substrates to each other.

2. A method of manufacturing a rewritable and rotatable multi-layer optical recording medium having a plurality of recording layers, wherein data recording areas are divided by preformatted areas in each of the plurality of recording layers in a tracing direction, comprising the steps of:
   A) forming a first projection of a circular shape on a first substrate such that said first projection is substantially coaxial to a rotation center of said first substrate, said first substrate having at least one recording layer;
   B) forming a first recess in a second substrate such that said first recess is substantially coaxial to a rotation center of said second substrate and adapted to engage with said first projection, said second substrate having at least one recording layer;
   C) forming a second recess in said first substrate in one of a center portion and a peripheral portion of said first substrate; and
   D) forming a second projection on said second substrate such that said second projection has a shape for engaging with said second recess; and
   E) attaching said first and second substrates to each other so as to engage said first projection and said second projection with said first recess and said second recess, respectively,
      wherein said second projection and said second recess are formed at positions so as to substantially align the preformatted areas of said first substrate with the preformatted areas of said second substrate when attaching said first and second substrates to each other.

3. A method of manufacturing a rewritable and rotatable multi-layer optical recording medium having a plurality of recording layers, wherein data recording areas are divided by preformatted areas in each of the plurality of recording layers in a tracing direction, comprising the steps of:

A) forming a first projection of a circular shape on a first substrate such that said first projection is substantially coaxial to a rotation center of said first substrate, said first substrate having at least one recording layer;

B) forming a first recess in a second substrate such that said first recess is substantially coaxial to a rotation center of said second substrate and adapted to engage with said first projection, said second substrate having at least one recording layer;

C) forming a first mark, which indicates a position of a preformatted area in said first substrate, on any one of a center portion, a peripheral portion and a peripheral side portion of said first substrate;

D) forming a second mark, which indicates a position of a preformatted area in said second substrate, on any one of a center portion, a peripheral portion and a peripheral side portion of said second substrate; and E) attaching said first and second substrates to each other while engaging said first projection with said first recess such that the first mark of said first substrate and the second mark of said second substrate are substantially aligned.

4. A multi-layer, rotation-type optical recording medium fabricated by the method according to claim 1.

5. A multi-layer, rotation-type optical recording medium fabricated by the method according to claim 2.

6. A multi-layer, rotation-type optical recording medium fabricated by the method according to claim 3.

* * * * *